US007860508B2

(12) United States Patent
Kumaki

(10) Patent No.: US 7,860,508 B2
(45) Date of Patent: Dec. 28, 2010

(54) MOBILE COMMUNICATION SYSTEM

(75) Inventor: Daisuke Kumaki, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 607 days.

(21) Appl. No.: 11/521,467

(22) Filed: Sep. 15, 2006

(65) Prior Publication Data
US 2008/0070568 A1    Mar. 20, 2008

(51) Int. Cl.
*H04W 72/00* (2009.01)
(52) U.S. Cl. ............. 455/450; 455/464; 455/509; 370/329; 370/341; 370/431
(58) Field of Classification Search ............. 455/450, 455/452.1, 455; 370/329, 431, 341
See application file for complete search history.

(56) References Cited

U.S. PATENT DOCUMENTS 5,644,621 A     7/1997  Yamashita et al.
6,064,889 A  *  5/2000  Fehnel ................ 455/511
6,078,572 A  *  6/2000  Tanno et al. ......... 370/335

FOREIGN PATENT DOCUMENTS

JP    2001-016642    1/2001
JP    2002-152820    5/2002

* cited by examiner

*Primary Examiner*—Lewis G West
*Assistant Examiner*—Jalaleddin Amirmokri
(74) *Attorney, Agent, or Firm*—Studebaker & Brackett PC; Donald R. Studebaker

(57) ABSTRACT

A mobile communication system, according to the present invention includes: a cell station; and a plurality of mobile stations, which are connectable to the cell station in wireless manner. Each of the mobile stations calculates a transmission timing of link channel request for communication with the cell station in accordance with a formula using a parameter, which is calculated using a random number.

2 Claims, 6 Drawing Sheets

MOBILE COMMUNICATION SYSTEM

TECHNICAL FIELD OF THE INVENTION

The present invention relates to a mobile communication system, and more particularly to a method for establishing a link channel between a cell station (base station) and mobile stations.

BACKGROUND OF THE INVENTION

There have been some different systems for mobile communication. One of them is a PHS (Personal Handy-phone System), which is called "second generation of wireless telephone system" and is standardized, for example, by ARIB STANDARD or RCR STD-28 V4.1.

U.S. Pat. No. 5,644,621 describes a radio telephone system, including a plurality of mobile stations (sub units) and a base station (main unit). According to this system, the base station is provided with a means for selecting one mobile station among the plurality of mobile stations. The selected mobile station is allowed to establish communication with the base station.

Japanese patent publication Kokai 2001-16642A describes a PHS system, in which transmission timing from a base station is automatically controlled to avoid signal conflict, for example, in FIG. 5. According to this system, a main unit supplies parameter data to cell stations (CS1-CSn) in synchronization with the same synchronization signal. Each cell station includes a control circuit, which generates a frame synchronization signal based on the parameter data. The frame synchronization signal is delayed from the synchronization signal.

Each cell station also includes a radio signal transmission circuit, which generates a pulse signal identifying a transmission timing of a control channel signal in accordance with the frame synchronization signal. A control circuit transmits a transmission detecting signal to the main unit. In response to a detection request signal from the main unit, the transmission detecting signal identifies a transmission timing of the pulse signal. The main unit compares transmission timing signals among all of the cell stations, and adjusts parameter data so as that transmission timings are prohibited from being in conflict among the cell stations.

Japanese Patent Publication Kokai No. 2002-152820 describes a PHS system, especially shown in FIG. 6, which provides opportunities of communication to mobile stations equally. A cell station (CS) has no available channel when data communication with two channels is performed with a mobile station (PS) 2-1. At that time, the cell station (CS) is not allowed to receive a link-channel establishing request from another mobile station (PS) 2-2. The cell station (CS) transmits a notification signal of refusal to the mobile station (PS) 2-2, while stores the rejected link-channel establishing request.

After data communication between the cell station (CS) and the mobile station (PS) 2-1, the cell station (CS) assigns a link channel to the other mobile station (PS) 2-2 in response to a link-channel establishing request transmitted from the mobile station (PS) 2-2. At that time, the other mobile station (PS) 2-1 is restricted to using one channel for communication.

In general, according to a PHS system, each of mobile stations searches the closest cell station for communication. Cell stations transmit control signals periodically, which are detected by mobile stations. In accordance with receipt of a control signal, a mobile station transmits a connection request signal to the cell station.

According to a conventional communication system, if enough cell stations are not provided, for example in a mountainous area, link-channel-requests might be conflicted among plural mobile stations. As a result, it would occasionally take a longer time to establish mobile communication (link channels).

OBJECTS OF THE INVENTION

Accordingly, an object of the present invention is to provide a mobile communication system, in which communication or connection can be established with a shorter period of time even in an area, where enough cell stations are not provided.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

Preferably, a CPU, included in a mobile station, performs the following calculations of:

(1) Calculating the receiving group number (GN) by the following formula F1, in which the station number (PSN) is divided by the product of the multiplication of "n_group" and "n_PCH, the remainder of the quotient of the division corresponding to "MOD".

$$GN=MOD(PSN, (n\_group*n\_PCH))+1 \qquad F1$$

"n_group": a factor for determining a receiving group

"n_PCH": the number of PCH (Paging Channels)

(2) calculating a first wait parameter X1 for link channel request by the following formula F2:

$$X1=MOD((GN*L4), 15)+1 \qquad F2$$

L4: last four bits of PS_ID (3) calculating a second wait parameter X2 for link channel request by the following formula F3:

$$X2=X1*RN \qquad F3$$

RN: random number (4) calculating a transmission timing (TT) by the following formula F4:

$$TT=X2+TT0 \qquad F4$$

TT0: a predetermined transmission timing for link channel request stored in the mobile station

SUMMARY OF THE INVENTION

According to the present invention, a mobile communication system includes: a cell station; and a plurality of mobile stations, which are connectable to the cell station in wireless manner. Each of the mobile stations calculates a transmission timing of link channel request for communication with the cell station in accordance with a formula using a parameter, which is calculated using a random number.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

According to an embodiment of the present invention, a mobile station includes a memory device and a CPU. The memory device stores station number data, a station ID and pseudorandom numbers, which are generated in accordance with a pseudorandom function. The pseudorandom function is stored in the memory device. A broadcast control channel transmitted from a cell station includes wireless channel information and system information. A wireless channel information notice, which is a kind of the broadcast control channel, includes "upward LCCH (Logical Control Channel) timing information" and "carrier structure information" for control. Usually, transmission timing of a link channel request is determined at a mobile station in accordance with the "upward LCCH timing information" and "carrier structure information".

According to the present invention, a mobile station calculates a transmission timing of a link channel request using the data stored in the memory device. A mobile station transmits a link channel request signal at the calculated timing to a cell station. A plurality of mobile station calculates different transmission timings for each mobile station, so that link channels can be established without conflict among the mobile stations.

Figure 1:
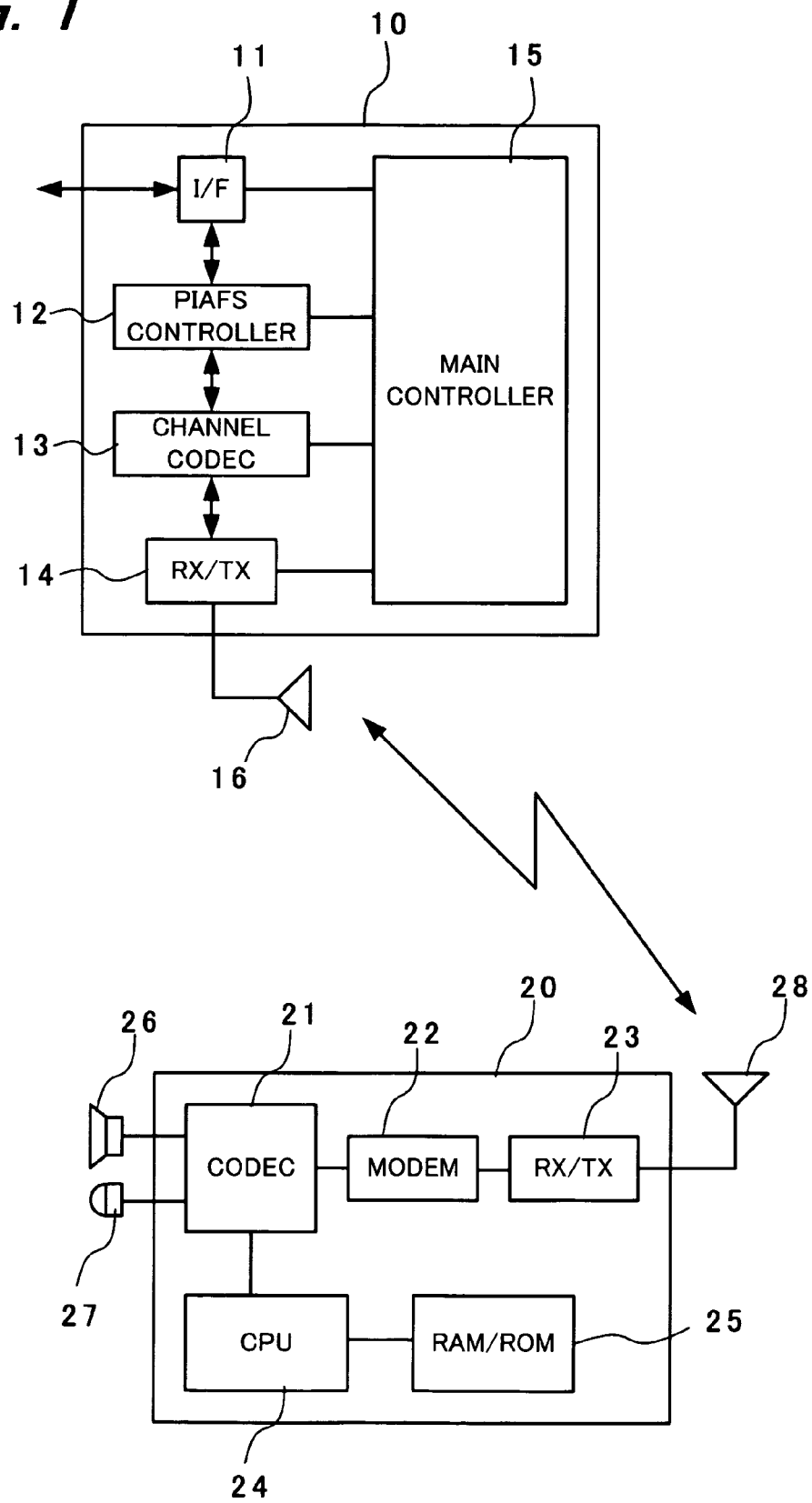
FIG. 1 is a block diagram illustrating a mobile communication system according to the present invention.

FIG. 1 is a block diagram illustrating a mobile communication system according to an embodiment of the present invention. This embodiment is applicable to a mobile communication system, called a PHS (Personal Handy-phone System). A mobile communication system according to the embodiment includes a cell station (CS) 10, which can be also called base station or relay station; and a plurality of mobile stations (PS) 20. The cell station (CS) 10 may be fixed in location.

The cell station (CS) 10 is connected to a communication circuit (wired communication line). The cell station (CS) 10 includes an interface circuit 11; a PIAFS (PHS Internet Access Forum Standard) controller 12; a channel CODEC 13; a receiving/transmitting unit 14; a main controller 15 and an antenna 16. The interface circuit 11 controls input/output operation between the cell station (CS) 10 and the wired communication line. The main controller 15 totally controls the interface circuit 11, the PIAFS controller 12, a channel CODEC 13 and the receiving/transmitting unit 14. The receiving/transmitting unit 14 is connected to the antenna 16.

Well known devices can be used for components of the cell station 10, and conventional technology will not be described here to avoid redundancy.

In this embodiment, at least two mobile stations (PHS or portable telephones) 20 are located in a single cell area of the cell station (CS) 10. The mobile station 20 includes a CODEC (Coder/Decoder) 21; a MODEM (Modulator/Demodulator) 22; a receiving/transmitting unit 23; a CPU (Central Processing Unit) 24; a memory device 25; a loud speaker 26; a microphone 27 and an antenna 28. Well known devices can be used for components of the mobile station 20, and conventional technology will not be described here to avoid redundancy.

The memory device 25 may be a nonvolatile memory and store a mobile station number (PSN), a station ID data (PS-ID) and pseudorandom numbers. The memory device 25 may be of a rewritable flash memory and a mask ROM. If the memory device 25 includes a rewritable flash memory and a mask ROM, the pseudorandom numbers and a pseudorandom number generation function would be stored in the flash memory, while the mobile ID data (PS-ID) would be stored in the mask ROM.

The speaker 26 and microphone 27 are used as a voice input/output device for talking.

When the mobile station 20 is turned on (powered on), the mobile station 20 start searching the cell station (CS) 10 for communication. The cell station (CS) 10 transmits a control signal periodically. The mobile station 20 receives the control signal by the antenna 28 and synchronizes to it. The mobile stations (PS) 20 transmit connection request (link channel request) signals to the cell station (CS) 10.

The cell station (CS) 10 transmits control information signals to the mobile stations (PS) 20, which is defined by a CCH (Common Control Channel). The common control channel CCH includes a BCCH (Broadcast Control Channel); a P C H (Paging Channel) and a SCCH (Signaling Control Channel).

The BCCH (Broadcast Control Channel) is a channel for one-way transmission from the cell station (CS) 10 to the mobile stations (PS) 20. The BCCH includes control information of channel structure and system information.

The PCH (Paging Channel) is a channel for one-way transmission from the cell station (CS) 10 to the mobile stations (PS) 20. The cell station (CS) 10 transmits the PCH, including the same information, to all of the mobile stations 20 at the same time in point-to-multipoint manner. The same PCH signal may be transmitted within a narrow or wide area including a single cell station or plural cell stations.

The SCCH (Signaling Control Channel) is a channel for transmitting information, which is independent and individual for each cell of the cell station (CS) 10, in point-to-point manner.

Figure 2:
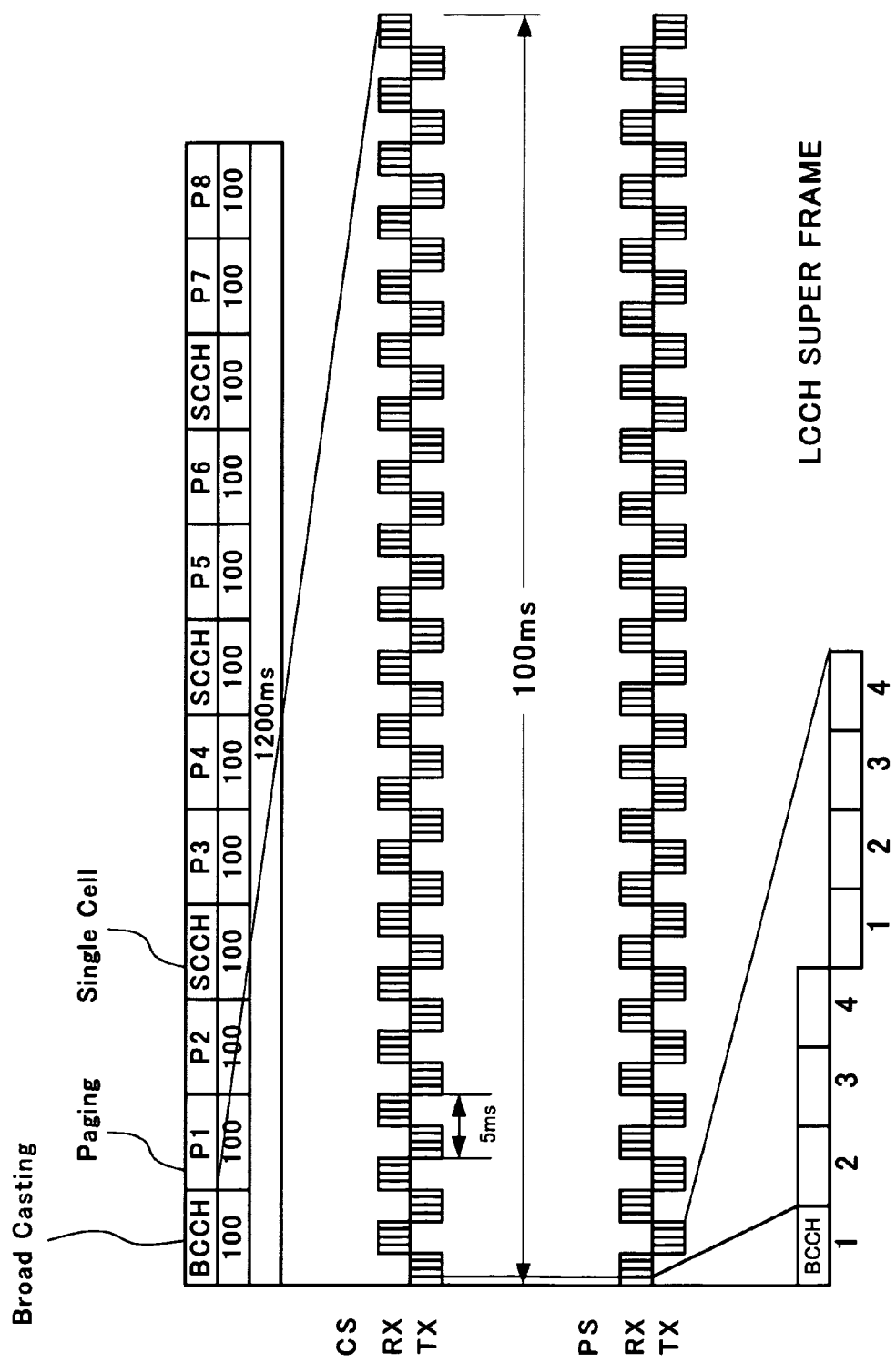
FIG. 2 shows a public LCCH (Logical Control Channel) super frame.

FIG. 2 shows a public LCCH super frame, transmitted from the cell station 10. A common control channel is transmitted as a LCCH (Logical Control Channel) super frame. In, general, the minimum transmission cycle of a LCCH super frame is 1.2 seconds. Such a LCCH super frame includes twelve control channels (BCCH, P1-P8, and 3 SCCH), each occupying a 100 ms period. Each of the twelve control channels (BCCH, P1-P8, and 3 SCCH) includes transmission slots TX and receiving slots RX. Four slots form a single TX block, while four slots form a single RX block. A pair of TX block and RX block has 5 ms cycle (period). Each slot of TX and RX has 625 µs cycle (period).

As shown in FIG. 2, a LCCH super frame includes a first slot for a broadcast control signal (BCCH), which is usually located at the first slot of the super frame. In other words, the BCCH indicates the first position of the LCCH super frame. The BCCH may be included other locations in the LCCH super frame. The second control channel is a PCH (paging channel), and the fourth control channel is a SCCH (Signaling Control Channel).

When the mobile station (PS) 20 receives an information signal of BCCH, the mobile station (PS) 20 establish a communication link (connection) with the cell station 10. For establishing a communication link, the mobile station 20 transmits a "link-channel-request (link channel establishing request) signal" to the cell station. The link-channel-request signal includes information on a type or kind of a link channel for communication and a type or kind of protocol for communication.

Figure 3:
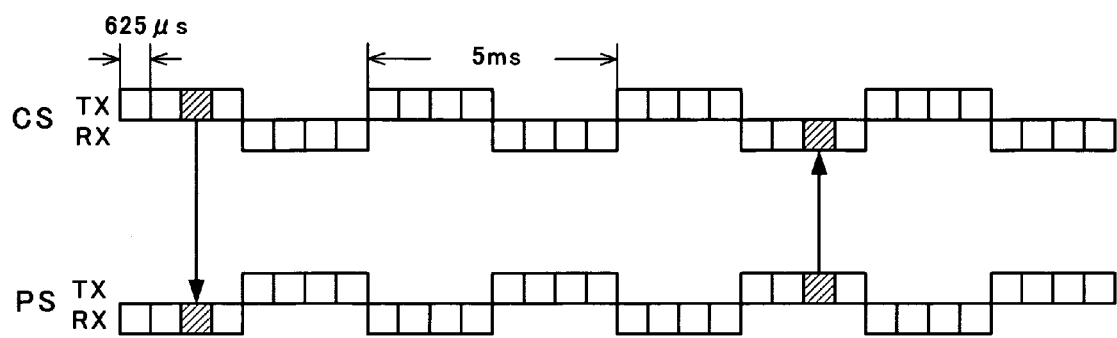
FIG. 3 is a timing chart showing transmission timing of information signal from a cell station and transmission timing of a link-channel-request signal from a mobile station.

FIG. 3 is a timing chart showing transmission timing of information signal from the cell station (CS) 10 and transmission timing of a link-channel-request signal transmitted from the mobile station (PS) 20. FIG. 3 shows the detail of the BCCH, which is located at the first position of the LCCH super frame transmitted from the cell station (CS) 10.

In the case of communication for talk, a single carrier frequency of LCCH is transmitted downwardly from the cell station (CS) 10. The cell station (CS) 10 is capable to receive a link-channel-request signal transmitted from the mobile stations (PS) 20 at an upward slot corresponding to a TDMA (time division multiple access) slot.

In FIG. 3, a downward arrow indicates that a third slot in a TX LCCH is transmitted from the mobile station (PS) 20 to the cell station (CS) 10. The cell station 10 can receive third slot in transmission (TX) slots, transmitted from mobile stations (PS) 20. An upward arrow in FIG. 3 indicates timing, at which the cell station (CS) 10 receives an upward LCCH signal. In this embodiment, the upward arrow indicates a slot in which the cell station (CS) 10 actually receives a link-channel-request signal.

Figure 4:
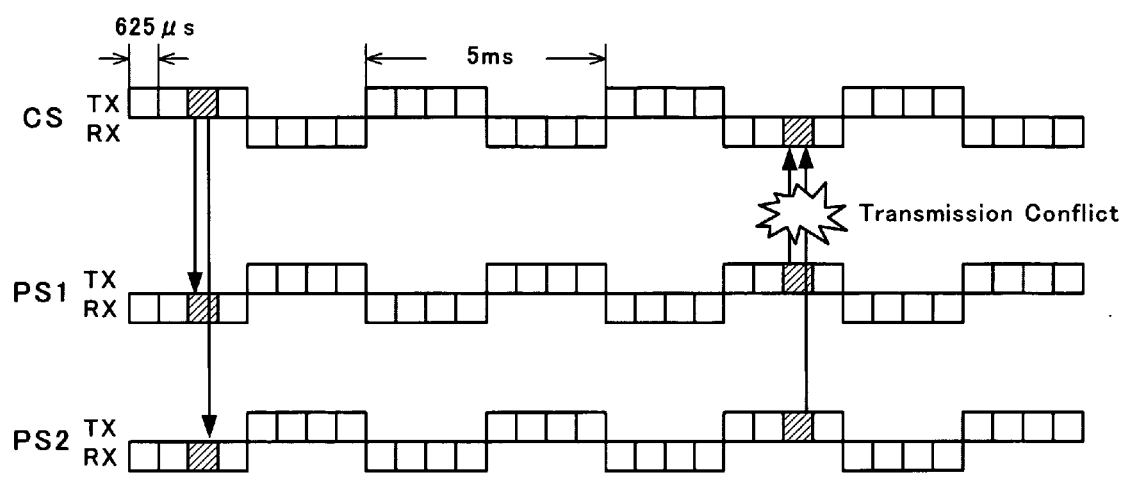
FIG. 4 is a timing chart showing a transmission conflict, occurs among a plurality of mobile stations, according to a conventional system.

FIG. 4 is a timing chart showing a transmission conflict, occurs among a plurality of mobile stations, according to a conventional system. In the case shown in FIG. 4, two mobile stations (PS1 and PS2) transmit link-channel-request signals in the same single cell (specific area), such as in the country area. Such two link-channel-request signals may conflict each other, so that those signals could be broken and the cell station (CS) could not receive them properly.

In a PHS system, if a plurality of link-channel-request signals conflict one another, the requesting operation would be repeated until a link channel is properly established. During requesting operation is repeated, mobile stations (PS) stand ready for next available timing.

In contrast, according to the present invention, conflict of link-channel-request signals is prevented and a link channel can be established promptly between a cell station and mobile stations. As a result, reliability of communication (link establishing) between a cell station and mobile stations is improved.

Figure 5:
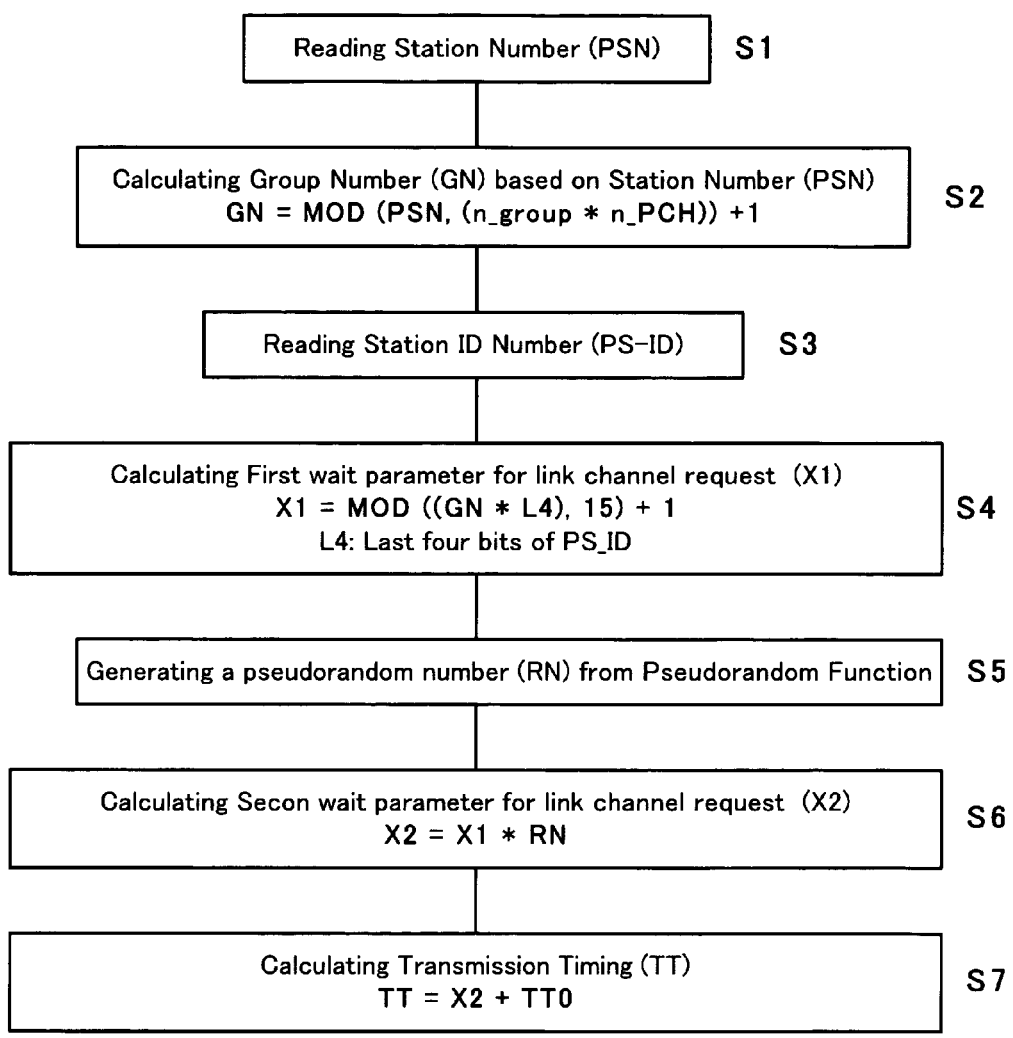
FIG. 5 is a flow chart showing operation of a mobile communication system according to the present invention.

FIG. 5 is a flow chart showing operation of a mobile communication system according to the present invention. The operation shown in the flow chart corresponds to a program executed in mobile stations. When a BCCH signal is transmitted from a cell station (CS) 10, mobile stations (PS) 20 receive the BCCH signal. The mobile stations (PS) 20 calculate transmission timing of link channel request signals in accordance with the BCCH signal.

As shown in FIG. 1, each mobile station (PS) 20 includes a memory device 25 storing a receiving group number, which is calculated from a station number (PS number). The station number (PS number) data, which includes its own (unique) data, are also stored in the memory device 25.

In each mobile station (PS) 20, a CPU 24 calculates its receiving group number (GN) in accordance with the PS number (PSN), stored in the memory device 25. The detail of such a calculation is shown in step 2 (S2). The PS number is a binary code. "n_group" indicates a factor for determining receiving groups. "n_PCH" indicates the number of PCH (Paging Channels). Generally, "n_group" is set to four "4" at a public cell station (base station, relay station). In this embodiment, "n_PCH" is set to two "2" at a public cell station.

In Step 2 (S2), adding one "1" is for avoiding the calculation result from becoming zero "0". In FIG. 5, "MOD" means modulo which is the remainder of division of two integral numbers. In Step 2, PSN (station number) is divided by the product of the multiplication of "n_group" and "n_PCH". The remainder of the quotient of the division corresponds to "MOD".

A first wait parameter for link channel request is calculated in accordance with the receiving group number (GN) and a station ID (i.e., Identification) (PS_ID), which is unique for each mobile station. The station ID (PS_ID) is stored in the memory device 25. In Step 3 (S3), the station ID is read from the memory device 25.

Next, in Step 4 (S4), the CPU 24 calculates a first wait parameter (X1) for link channel request in accordance with an equation shown in S4 block. The receiving group number (GN) and the last four bits of the station ID (L4) are multiplied together. The product of the multiplication is divided by fifteen. The remainder of the quotient of the division corresponds to "MOD ((GN*L4), 15)". A first wait parameter (X1) for link channel request is calculated by adding one to "MOD ((GN*L4), 15)". Adding one is for avoiding the calculation result becomes zero "0".

A second wait parameter (X2) for link channel request is calculated using the first wait parameter (X1) for link channel request and a pseudorandom number (RN), supplied from a pseudorandom number generation function stored in the memory device 25. The pseudorandom number generation function generates pseudorandom numbers (RN) in Step 5, which are supplied to the CPU 24. The CPU 24 calculates the second wait parameter X2 for link channel request by multiplying the first wait parameter X2 and the pseudorandom number (RN) in Step 6 (S6).

Each of mobile stations 20 has predetermined transmission timing (TT0) for link channel request. The CPU 24 adds up the predetermined transmission timing (TT0) and the second wait parameter X2 for link channel request (Step 7). As a result, transmission timing for link channel request is determined for each mobile station independently.

Figure 6:
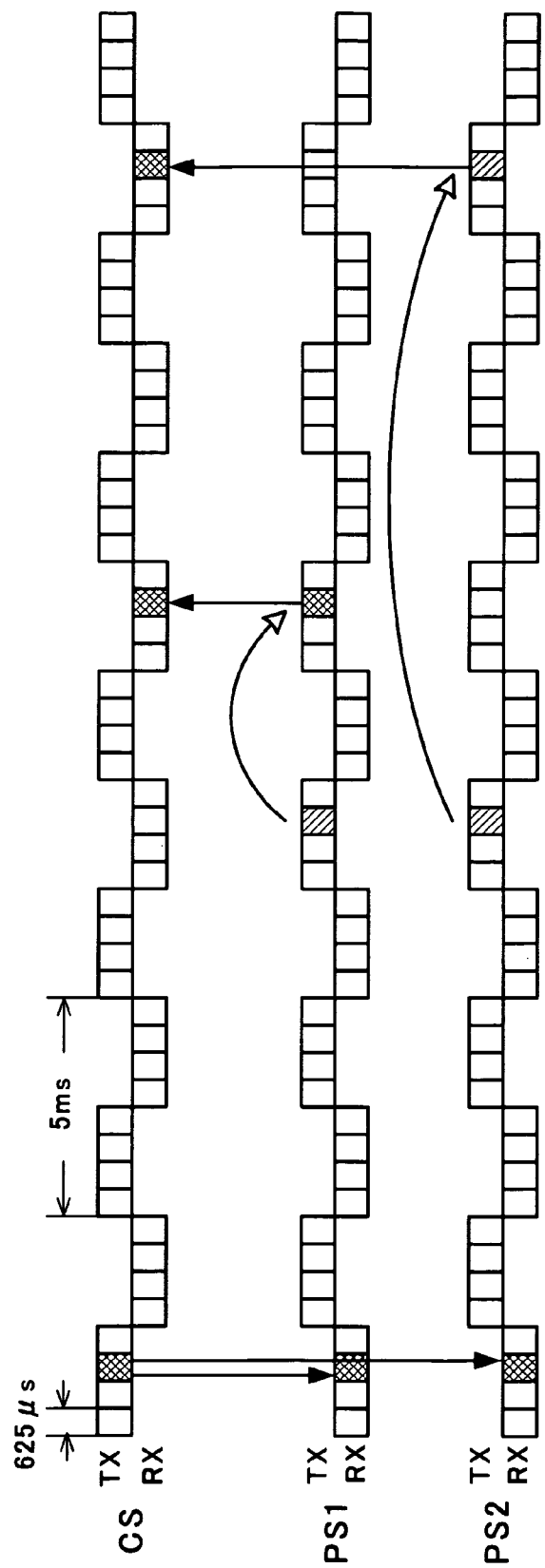
FIG. 6 is a timing chart showing transmission timing of information signal from a cell station and transmission timing of a link-channel-request signal from a mobile station, according to the present invention.

FIG. 6 is a timing chart showing transmission timing of information signal from a cell station and transmission timing of a link-channel-request signal from a mobile station, according to the present invention. In the case shown in FIG. 6, a couple of mobile stations transmit link-channel-request signals in the same single cell (specific area), such as in the country area. According to a conventional system, such two link-channel-request signals may conflict each other, so that those signals could be broken and the cell station (CS) could not receive them properly.

A carrier frequency of LCCH is transmitted downwardly from the cell station (CS) 10 to the mobile stations (PS1 and PS2), as indicated by a downward arrow in FIG. 6. In each mobile station (PS1 and PS2), a transmission timing of a link channel request signal is calculated. The mobile station PS1 has a wait parameter of "1" for link channel request. The mobile station PS1 transmits a link channel request signal 15 ms after a downward LCCH is supplied thereto. On the other hand, the mobile station PS2 has a wait parameter of "3" for link channel request. The mobile station PS2 transmits a link channel request signal 25 ms after a downward LCCH is supplied thereto.

As described above, link channel request signals are prevented from being conflicted between the mobile stations PS1 and PS2. The cell station (CS) 10 does not have a receipt error, and link channels are established to both the mobile stations PS1 and PS2 without a long waiting time.

According to the present invention, conflict of link-channel-request signals is prevented and a link channel can be established promptly between a cell station and mobile stations. As a result, reliability of communication (link establishing) between a cell station and mobile stations is improved.

What is claimed is:

1. A mobile communication system, comprising:
    a cell station; and
    a plurality of mobile stations wirelessly connectable to the cell station, wherein each of the mobile stations is configured to calculate a transmission timing of link channel request for communication with the cell station in accordance with a formula using a parameter, which is calculated using a random number, and
    wherein each of the mobile stations is further configured to calculate a transmission timing of a logical control channel establishment request signal to be transmitted from a mobile station to the cell station, the transmission timing of a logical control channel establishment request signal is calculated based on a specific number provided to each mobile station such that conflict of requests among the plurality of mobile stations may be prevented;
    wherein each of the mobile stations comprises a memory device, storing its own station number ID (Identification) data and a pseudorandom function; and a CPU (Central Processing Unit), which calculates the transmission timing; and
    wherein the CPU calculates a receiving group number using the station number; a first parameter for link channel request using the receiving group number and the ID data; a second parameter for link channel request using the first parameter and the random number; and the transmission timing using the second parameter and an initially determined timing.

2. A mobile communication system according to claim 1, wherein the CPU is configured to perform the following calculations:

(1) Calculating the receiving group number (GN) by the following formula F1, in which the station number (PSN) is divided by the product of the multiplication of "n_group" and "n_PCH", the remainder of the quotient of the division corresponding to "MOD", wherein $$GN=MOD(PSN,(n\_group*n\_PCH))+1 \qquad \text{F1, wherein}$$

"n_group": a factor for determining a receiving group, and

"n_PCH": the number of PCH (Paging Channels);

(2) calculating a first wait parameter X1 for link channel request by the following formula F2:

$$X1=MOD((GN*L4),15)+1 \qquad \text{F2, wherein}$$

L4: last four bits of PS_ID;

(3) calculating a second wait parameter X2 for link channel request by the following formula F3:

$$X2=X1*RN \qquad \text{F3, wherein}$$

RN: random number; and (4) calculating a transmission timing (TT) by the following formula F4:

$$TT=X2+TT0 \qquad \text{F4, wherein}$$

TT0: a predetermined transmission timing for link channel request stored in the mobile station.

* * * * *